(12) United States Patent
Tokarev et al.

(10) Patent No.: US 12,361,131 B2
(45) Date of Patent: Jul. 15, 2025

(54) UNPACKING SOFTWARE VIA AUTO-UNPACKER INTERCEPTION

(71) Applicant: Microsoft Technology Licensing, LLC, Redmond, WA (US)

(72) Inventors: Vladimir Tokarev, Herzelia (IL); Yuval Gordon, Givataiym (IL); Gil Regev, Yehud (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 147 days.

(21) Appl. No.: 18/323,100

(22) Filed: May 24, 2023

(65) Prior Publication Data
US 2024/0394369 A1    Nov. 28, 2024

(51) Int. Cl.
G06F 21/56    (2013.01)
G06F 9/50     (2006.01)
G06F 21/55    (2013.01)

(52) U.S. Cl.
CPC .......... *G06F 21/566* (2013.01); *G06F 9/5016* (2013.01); *G06F 21/554* (2013.01); *G06F 2221/034* (2013.01)

(58) Field of Classification Search
None
See application file for complete search history.

(56) References Cited

U.S. PATENT DOCUMENTS

2014/0283058 A1*  9/2014  Gupta ................ G06F 21/562
                                              726/23
2022/0261481 A1   8/2022  Fitzgerald

FOREIGN PATENT DOCUMENTS

| AU | 2008202532 A1 | 1/2009 |
| CA | 3201355 A1 | 6/2022 |
| WO | 2019067689 A1 | 4/2019 |

OTHER PUBLICATIONS

David Drysdale, "How programs get run: ELF binaries", retrieved from << https://lwn.net/Articles/631631/ >>, Feb. 4, 2015, 8 pages.
(Continued)

*Primary Examiner* — Syed A Roni

(57) ABSTRACT

Some embodiments of an interception-based unpacker leverage an auto-unpacker of a packed file, using certain hooks, to obtain unpacked content even when the specific compression and encryption algorithms that were used to pack the packed file are unknown. The unpacked content is studied directly, or injected into a copy of the packed file to create an unpacked executable version of the packed file. A hook on a process loader is utilized to obtain a pre-execution map of memory allocated to a target packed process. One or more interrupt hooks or system call hooks, which are triggered by permission changes or by write permission or execution permission exceptions, are utilized to obtain copies of unpacked content. In some embodiments, the interception-based unpacker executes primarily or entirely in kernel space. Embodiments of the interception-based unpacker are operable in open source kernel or closed source kernel operating systems.

20 Claims, 3 Drawing Sheets

(56) References Cited

OTHER PUBLICATIONS

Robert Love, "Linux Kernel Development", 3rd Edition, retrieved from << https://www.doc-developpement-durable.org/file/Projets-informatiques/cours-&-manuels-informatiques/Linux/Linux Kernel Development, 3rd Edition.pdf, no later than Dec. 31, 2010, 468 pages.
"Function report", retrieved from << http://www.bricktou.com/fs/execfinalize_exec_en.html >>, Jul. 28, 2022, 1 page.
Albert Zsigovits, "UPX Anti-Unpacking Techniques in IoT Malware", retrieved from << https://cujo.com/upx-anti-unpacking-techniques-in-iot-malware/ >>, Aug. 17, 2020, 18 pages.
Itamar Maouda, "Hunting Rootkits with eBPF: Detecting Linux Syscall Hooking Using Tracee", retrieved from << https://blog.aquasec.com/linux-syscall-hooking-using-tracee >>, Apr. 21, 2022, 15 pages.
Priyadharshini Balaji, "How to Perform Static Code Analysis on Packed Malware ?", retrieved from << https://www.socinvestigation.com/how-to-perform-static-code-analysis-on-packed-malware/ >>, Apr. 3, 2023, 6 pages.
"Executable compression", retrieved from << https://en.wikipedia.org/wiki/Executable_compression >>, Mar. 15, 2023, 11 pages.
"Robust Automated Malware Unpacker", retrieved from << https://github.com/fkie-cad/RoAMer >>, on or about Apr. 4, 2023, 5 pages.
Thorsten Jenke, Daniel Plohmann, and Elmar Padilla, "RoAMer: The Robust Automated Malware Unpacker," 2019 14th International Conference on Malicious and Unwanted Software (Malware), Nantucket, MA, USA, no later than Dec. 31, 2019, pp. 67-74.
Lutz Bohne, "Pandora's Bochs: Automatic Unpacking of Malware", retrieved from << https://citeseerx.ist.psu.edu/document?repid=rep1&type=pdf&doi=caf575eb8dc62090308e5160977eec07a0a87923 >>, Jan. 28, 2008, 121 pages.
Lorenzo Martignoni, et al., "OmniUnpack: Fast, Generic, and Safe Unpacking of Malware", retrieved from << https://www.acsac.org/2007/papers/151.pdf >>, no later than Dec. 31, 2007, 10 pages.
Fanglu Guo, Peter Ferrie, and Tzi-cker Chiueh, "A Study of the Packer Problem and Its Solutions (slides)", retrieved from << http://pferrie.epizy.com/papers/packerproblem.pdf >>, Sep. 16, 2008, 23 pages.
"BlackOfWorld/NtCreateUserProcess", retrieved from << https://github.com/BlackOfWorld/NtCreateUserProcess >>, no later than May 10, 2023, 2 pages.
Egele, et al., "A survey on automated dynamic malware-analysis techniques and tools", ACM Computing Surveys (CSUR), vol. 44, Issue 2, Mar. 5, 2008, pp. 1-42.
International Search Report and Written Opinion received for PCT Application No. PCT/US2024/029555, Sep. 5, 2024, 16 pages.

* cited by examiner

UNPACKING SOFTWARE VIA AUTO-UNPACKER INTERCEPTION

BACKGROUND

Software and other kinds of digital information are sometimes compressed to reduce their size for more efficient storage or more efficient transmission. An archive file is an example of a compressed file. Software and other kinds of digital information are sometimes encrypted to keep the meaning of their content hidden. Compression and encryption are used individually in some situations, and used together in other situations. For example, data may be encrypted and then compressed, or may be compressed and then encrypted. Encryption, or compression, or both, may also be applied more than once, using the same parameters (e.g., algorithms, encryption keys) or using different ones. As one of many possible examples, a file of data is encrypted using a first encryption algorithm, then the result is encrypted using a second encryption algorithm, and then that result is compressed using a compression algorithm.

Software packers perform compression or encryption, or both, on a piece of original software, thereby producing packed software. An auto-unpacker is a subprogram of a software program which the auto-unpacker unpacks when the auto-unpacker is executed. A self-extracting archive file similarly includes a decompression subprogram which decompresses the rest of the archive file when the decompression subprogram is executed. Understanding the design and intended behavior of packed software is often difficult unless unpacking makes the original software available.

Although compression and encryption have been used, studied, and modified for several decades, improvements in the analysis of packed software are still possible.

SUMMARY

Some packed software contains malware, but other packed software does not. Determining whether packed software contains malware without simply letting the packed software run freely is less difficult (although not necessarily easy) when an unpacked version of the software is available. But malware often tries to make its unpacked version unavailable for analysis. Some embodiments taught herein address this technical challenge by leveraging auto-unpacker activity to get a copy of an unpacked version of packed software.

Some embodiments intercept auto-unpacker operations on a packed software to obtain a copy of the content of an unpacked version of the packed software. The packed software includes a target process in a computing system. Prior to the target process receiving control, some embodiments execute a process loader hook on a process loader routine. The process loader routine is configured to allocate memory for the target process prior to an execution period of the target process. Executing the process loader hook saves a map of memory which is allocated to the target process. During the execution period of the target process, some embodiments perform at least one of the following: detect an additional allocation attempt of a memory portion to the target process and save a description of the memory portion, or recognize a change attempt in an execution permission of a memory portion that is allocated to the target process and save a description of the memory portion. The saved descriptions are used by some embodiments to create a file containing an unpacked version of the target process. Some embodiments execute entirely in a kernel space.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form-some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
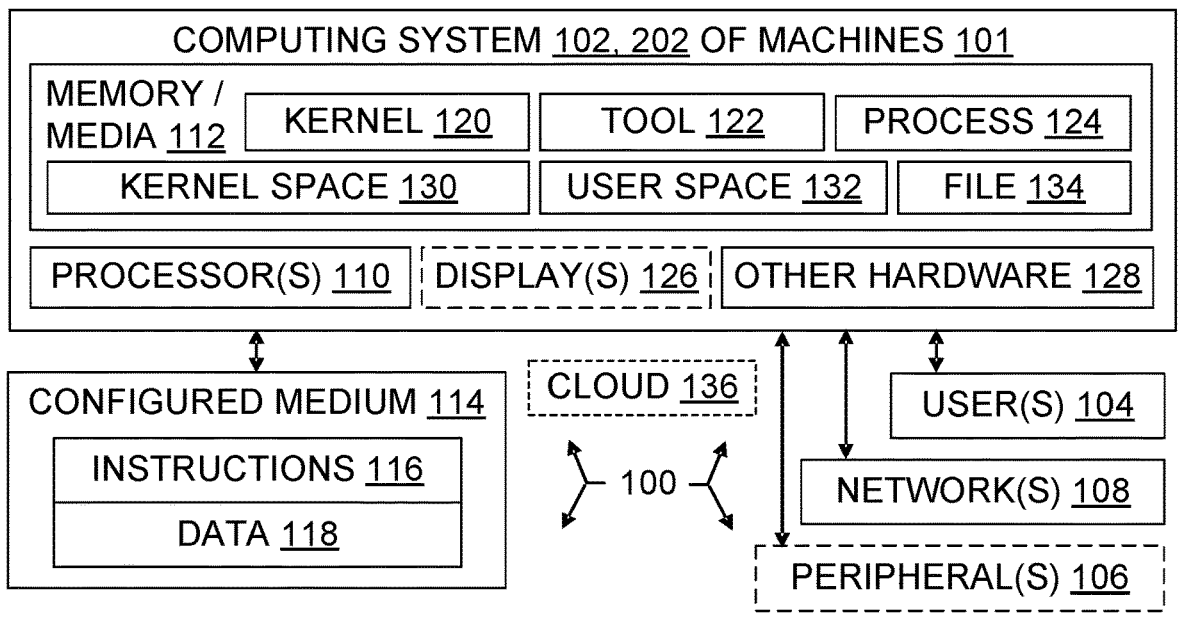
FIG. 1 is a diagram illustrating aspects of computer systems and also illustrating configured storage media, including some aspects generally suitable for systems which provide auto-unpacker interception functionality.

Some teachings described herein were motivated by technical challenges faced during efforts to improve technology for detecting malware in computing systems. In particular, challenges were faced during efforts to improve unpacking technology. These challenges were motivations, but teachings herein are not limited in their scope or applicability to the particular motivational challenges.

Packers are software tools that pack different executables for different operating systems and different computing architectures. Packers have legitimate uses, but packers are also used to mask the content of malware executables. Packers can encrypt, compress, or simply change the format of an executable file to make it look like something else. Malware is often packed in order to make the static reverse engineering of the malware executable extremely hard. Indeed, sometimes static reverse engineering is prevented by packing. In the realm of Internet of Things (IoT) security, an estimated 80% percent of malware uses packers to hide its original code.

Packing hinders malware detection in at least two ways. First, although malware is often packed, legitimate software is also sometimes packed, so unpacking is often required to distinguish malware from non-malware. Barring software merely because it is packed would bar a lot of malware, but would also bar significant amounts of non-malware. Thus, for unpacking is often performed or at least attempted, which imposes additional computational overhead even when no malware is present. Second, sometimes unpacking a file is not feasible because the packing algorithm used is unrecognized. Malware authors continually vary the packing algorithms they use to package malware. The use of an unfamiliar packing algorithm is one factor suggesting that the packed software is malware, but detecting the use of an unfamiliar packing algorithm is not a substitute for analysis of an unpacked version of the software. Security analysts do not stop with a conclusion that malware is present; they also try to determine exactly what a given piece of malware will do if it is allowed to execute.

Accordingly, one technical challenge driven by cybersecurity efforts is how to obtain an unpacked version of a packed software even when the packing algorithm used is not recognized. Some embodiments taught herein meet this challenge by intercepting certain unpacking actions performed by auto-unpackers.

For example, when an auto-packer runs, it will often allocate a new memory portion (e.g., a page, a block, a segment, etc.) to receive encrypted or compressed content. Then the auto-packer will add or verify the presence of execution permission for this new memory portion, and launch execution of the content that was placed in the new memory portion. In addition to using different compression or encryption algorithms, some other variations occur between auto-unpackers. For instance, the size or number of memory portions varies, and sometimes an auto-unpacker puts the packed content into one of its own executable segments instead of allocating another segment. However, new memory portion allocation and executable permission setting actions are performed by many auto-unpackers; these actions are among the actions which are intercepted and leveraged by embodiments taught herein.

Some embodiments described herein utilize or provide an unpacking method performed by a computing system, the unpacking method including: prior to a target process receiving control, executing a process loader hook on a process loader routine, the process loader routine configured to allocate memory for a target process prior to an execution period of the target process, the process loader hook executing including saving a map of memory which is allocated to the target process; and during the execution period of the target process, performing at least one of the following: detecting an additional allocation attempt of a memory portion to the target process and saving a description of the memory portion, recognizing a change attempt in an execution permission of a memory portion that is allocated to the target process and saving a description of the memory portion, or ascertaining that the target process is attempting to overwrite a memory portion that was allocated to the target process before the execution period of the target process and saving a description of the memory portion.

In these embodiments, this unpacking functionality has the technical benefit of working with a wide variety of packed software, because the unpacking functionality intercepts and leverages actions of the packed software's own auto-unpacker. For example, it is unnecessary for this unpacking functionality to determine which particular compression algorithms or encryption algorithms are used by the auto-unpacker, because the auto-unpacker itself implicitly or explicitly embodies that algorithm recognition. Telemetry representing these intercepted actions characterizes the auto-unpacker, helping to distinguish it from other auto-unpackers. In some cases, the unpacking functionality also obtains access to a copy of the unpacked (non-compressed and non-encrypted) content that is produced by the auto-unpacker.

In some embodiments, the unpacking method is performed entirely in a kernel space of the computing system. This restriction to kernel space has the technical benefit of giving the unpacking functionality access to all the logic that happens to newly created processes, which allows the unpacking functionality to intercept low-level actions such as memory allocation attempts and execution permission change attempts. Residence in kernel space also helps protect the unpacking functionality itself from cyberattacks, which are generally more difficult to perform in kernel space than in user space.

In some embodiments, the unpacking method creates a file containing content of multiple memory portions, the creating based at least in part on saved descriptions of the memory portions. File creation sometimes includes patching a program header, or making a section header, in addition to copying unpacked content. Unpacked content file creation has the technical benefit of providing a copy of an unpacked version of the packed software, which allows security analysts to obtain static analysis results and other reverse engineering results. Reverse engineering results are very helpful in distinguishing between malware and non-malware, and in tracking the evolution of malware and relationships between various malware instances. Analysis of unpacked malware helps identify malware origins, improve malware detection, improve defenses against malware, and improve remediation of damage done by malware.

In some embodiments, the unpacking method ascertains that the target process is attempting to overwrite a memory portion that was allocated to the target process before the execution period of the target process. This has the technical benefit of allowing the unpacking functionality to work with a broader set of auto-unpackers, which includes auto-unpackers that attempt to evade anti-malware tools by staying within their initial memory footprint.

In some embodiments, the unpacking method groups an identifier of the target process with an identifier of another process, the grouping based on at least a process spawning relationship, and associates multiple process identifiers with a persistent copy of unpacked executable code of the target process based on at least the grouping. This use of process identifiers has the technical benefit of helping the unpacking functionality provide a copy of unpacked code even when the unpacked code corresponds to several cooperating processes. Some malware executes as a single process, but other malware includes two or more cooperating processes, e.g., a parent process and a child process spawned by the parent process. Grouping process identifiers allows the unpacking functionality to gather and correlate unpacked content from multiple related processes, thereby providing a more complete version of the unpacked content for security analysis.

In some embodiments, the target process includes a system call to an operating system which belongs to at least one of the following operating system categories: open source kernel operating systems, or closed source kernel operating systems. In other words, in these embodiments the unpacking functionality is at least somewhat agnostic (a.k.a. neutral) with respect to operating systems. This has the technical benefit of permitting the unpacking functionality to work with a wider set of operating systems, including both open source kernel operating systems such as Linux® and macOS® operating systems, and closed source kernel operating systems such as Windows® operating systems (marks of Linus Torvalds, Apple Inc., Microsoft Corporation, respectively).

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 330 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, auto-unpacker interception functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More about Systems

Figure 2:
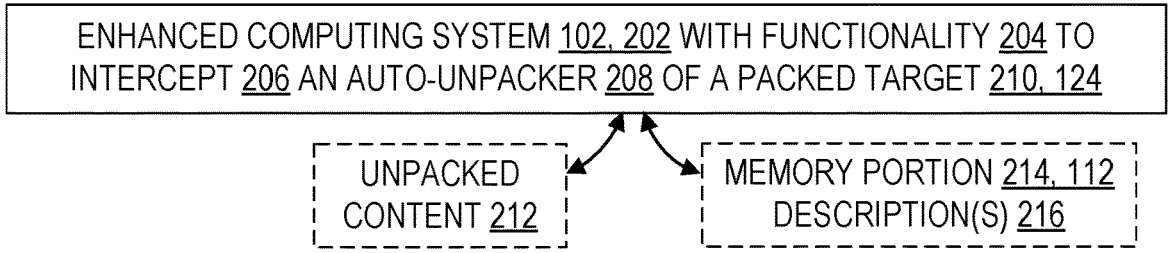
FIG. 2 is a block diagram illustrating an enhanced system configured with an auto-unpacker interception functionality.

FIG. 2 illustrates a computing system 102 configured by one or more of the auto-unpacker interception enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
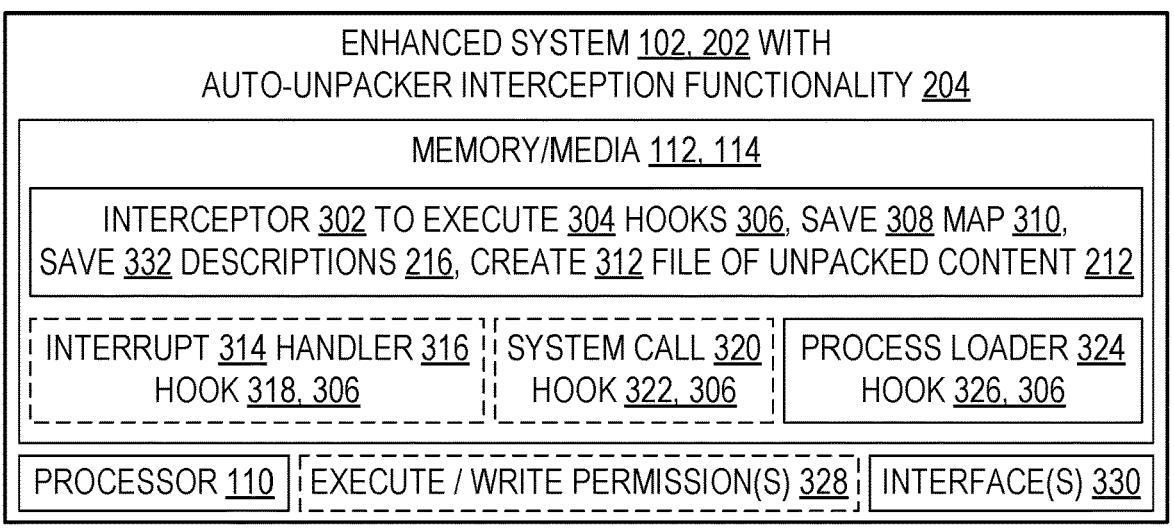
FIG. 3 is a block diagram illustrating aspects of a system enhanced with an auto-unpacker interception functionality.

FIG. 3 shows some aspects of some enhanced systems 202. This is not a comprehensive summary of all aspects of enhanced systems 202 or all aspects of auto-unpacker interception functionality 204. Nor is it a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

Figure 4:
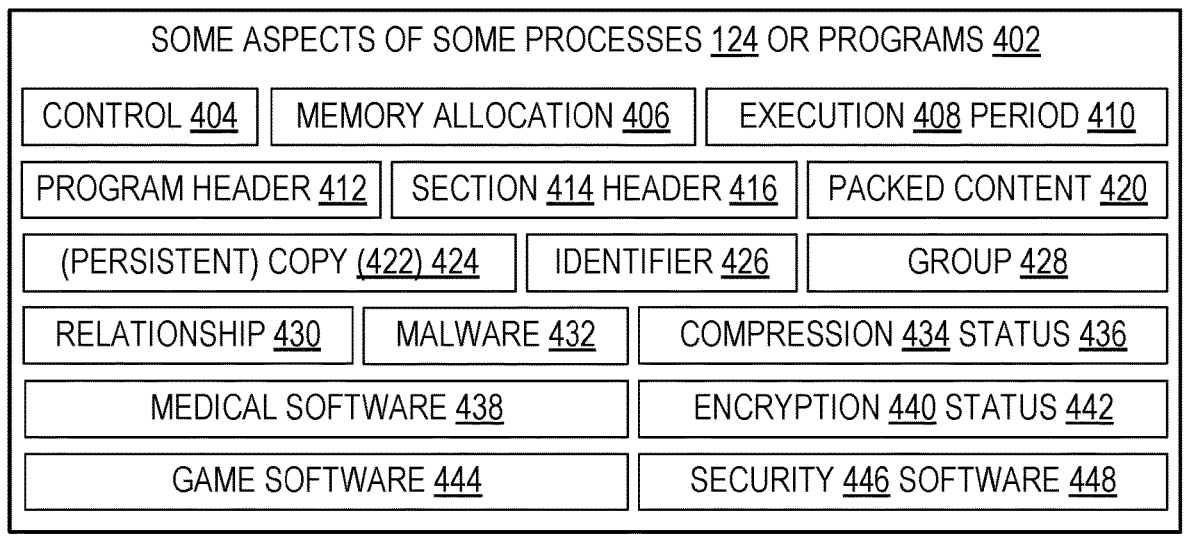
FIG. 4 is a block diagram illustrating some additional aspects of processes or programs.

FIG. 4 shows some additional aspects of processes 124 or programs 402. A program 402 includes one or more processes 124. This is not a comprehensive summary of all additional aspects of processes 124 or programs 402. FIG. 4 items are discussed at various points herein, and additional details regarding them are provided in the discussion of a List of Reference Numerals later in this disclosure document.

Figure 5:
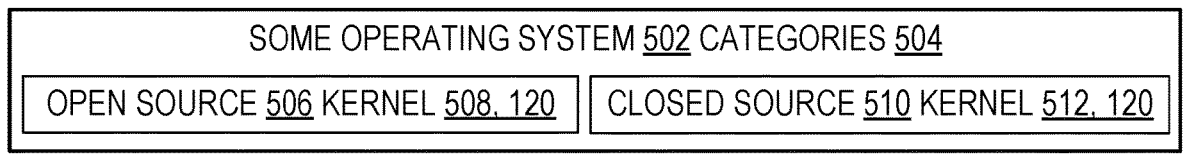
FIG. 5 is a block diagram illustrating some operating system categories.

FIG. 5 shows some operating system 502 categories 504. This is not a comprehensive summary of all aspects of operating systems 502 or operating system kernels 120. In addition to a kernel 10, an operating system sometimes includes one or more shells, drivers, and non-kernel modules, for example. FIG. 5 items are discussed at various points herein, and additional details regarding them are provided in the discussion of a List of Reference Numerals later in this disclosure document.

Figure 6:
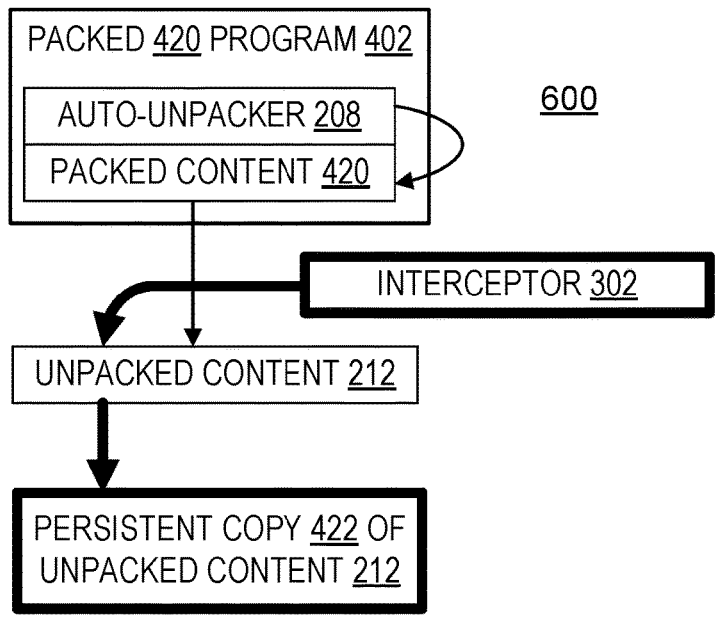
FIG. 6 is a data flow diagram illustrating some aspects of auto-unpacker interception.
Figure 7:
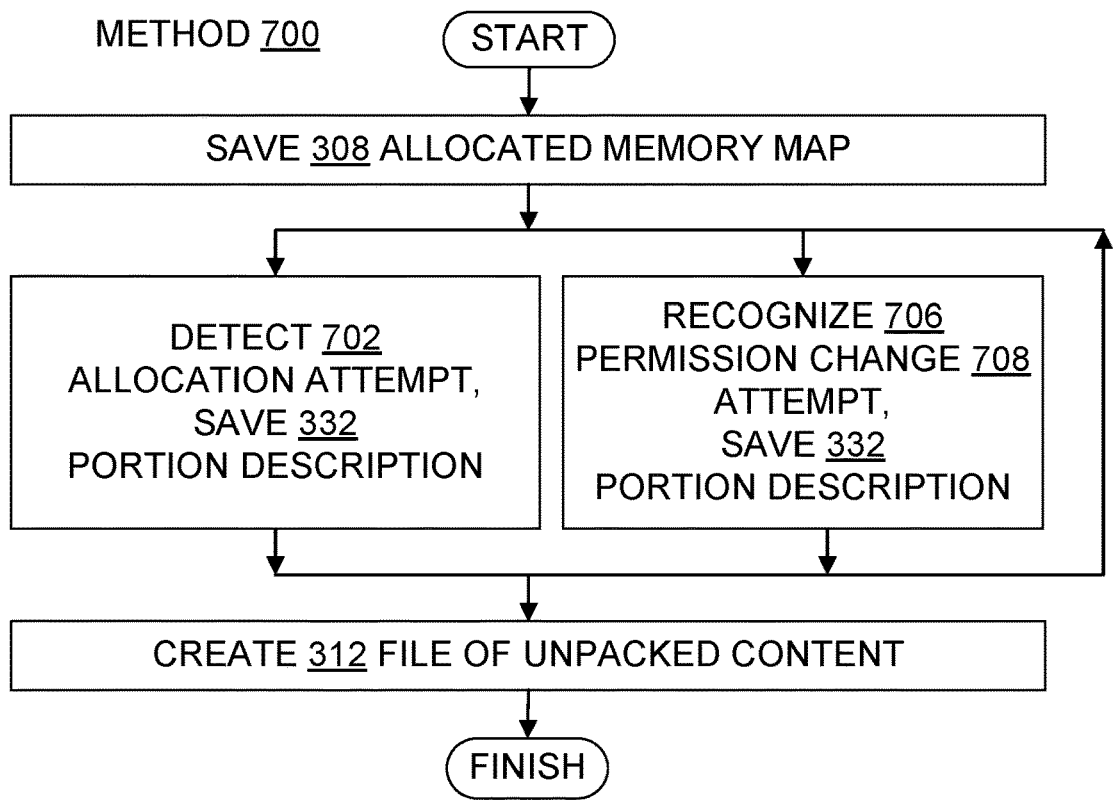
FIG. 7 is a flowchart illustrating steps in an auto-unpacker interception method.
Figure 8:
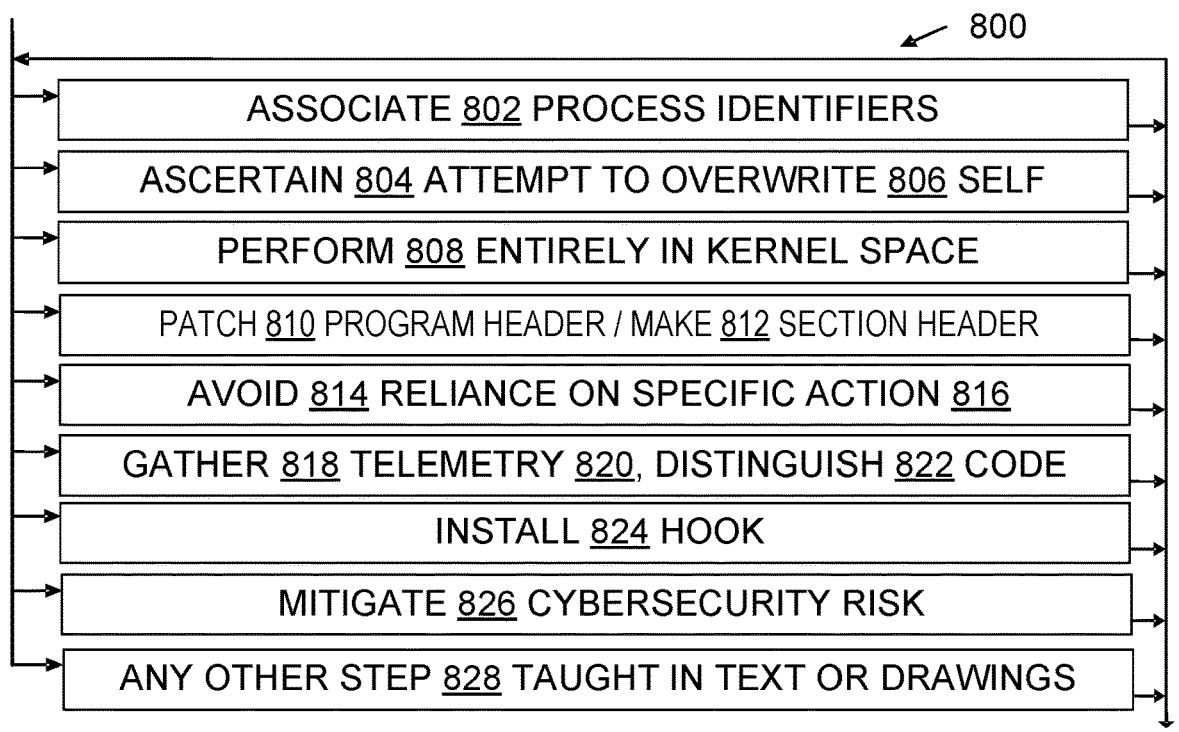
FIG. 8 is a flowchart further illustrating steps in some auto-unpacker interception methods, and incorporating FIG. 7.

The other figures are also relevant to systems 202. FIGS. 6, 7, and 8 illustrate methods of functionality 204 operation in systems 202.

In some embodiments, the enhanced system 202 is networked through an interface 330. In some, an interface 330 includes hardware such as network interface cards, software such as network stacks, APIs, or sockets, combination items such as network connections, or a combination thereof.

Some embodiments include a computing system 202 which is configured to obtain unpacked file content from packed file content. The computing system includes: a digital memory 112 which includes the managed memory 112, and a processor set 110 including at least one processor, the processor set in operable communication with the digital memory. The system 202 also includes an auto-unpacker interceptor 302, which is configured to, upon execution by the processor set, execute 304 a process loader hook 326 on a process loader routine 324, the process loader routine configured to allocate memory for a target process 124 prior to an execution period 410 of the target process, the process loader hook executing including saving 308 a map 310 of memory which is allocated to the target process. The auto-unpacker interceptor 302 is also configured to upon execution save 332 a description 216 of a memory portion 214 in response to detecting 702 an additional allocation attempt of the memory portion or in response to recognizing 706 a change attempt in an execution permission 328 of the memory portion or in response to ascertaining 804 that the target process is attempting to overwrite 806 a memory portion that was allocated to the target process before the execution period of the target process. In some embodiments, the auto-unpacker interceptor is also configured to upon execution create 312 a file containing content 118 of the memory portion based at least in part on the saved description of the memory portion. In some embodiments, the file content 118 is unpacked content 212 which is not compressed and is not encrypted.

Although malware analysis was a motivation, the unpacker 302 is not limited to use with malware. In some embodiments, the file 134 content 118 includes at least one of: a malware 432, a security software 448, a game software 444, or a medical software 438.

In some embodiments, the functionality 204 hooks 306 include at least one of: an interrupt handler hook 318 on an interrupt handler 316, the interrupt handler hook configured to detect 702 the additional allocation 406 attempt of the memory portion 214 to the target process and to save 332 the description 216 of the memory portion; or an interrupt handler hook 318 on an interrupt handler 316, the interrupt handler hook configured to recognize 706 the change attempt in the execution permission 328 of the memory portion 214 that is allocated to the target process and to save 332 the description 216 of the memory portion.

In some embodiments, the functionality 204 hooks 306 include at least one of: a system call hook 322 on a system call 320, the system call hook configured to detect 702 the additional allocation 406 attempt of the memory portion 214 to the target process and to save 332 the description 216 of the memory portion; or a system call hook 322 on a system call 320, the system call hook configured to recognize 706 the change attempt in the execution permission 328 of the memory portion 214 that is allocated to the target process and to save 332 the description 216 of the memory portion.

In some embodiments, the target process includes a system call 320 to an operating system 502 which belongs to at least one of the following operating system categories 504: open source 506 kernel operating systems, or closed source 510 kernel operating systems.

In some embodiments, an auto-unpacker interception architecture 600 is utilized. During execution of an auto-unpacker 208 in a packed program 402, unpacked content 212 is computationally derived from packed content 420 by decompression, decryption, and other operations in a computing system. As indicated by bold lines in FIG. 6, an auto-unpacker interceptor 302 intercepts some of these auto-unpacker operations, by using hooks 306. The auto-unpacker interceptor 302 also performs additional operations, such as saving 332 memory portion descriptions and creating 312 a file 134 of unpacked content for subsequent security analysis.

Other system embodiments are also described herein, either directly or derivable as system versions of described processes or configured media, duly informed by the extensive discussion herein of computing hardware.

Although specific auto-unpacker interception architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of unpacking functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 7 and 8 each illustrate a family of methods 700 and 800 respectively, which are performed or assisted by some enhanced systems, such as some systems 202 or another unpacking functionality enhanced system as taught herein. Method family 700 is a proper subset of method family 800.

Some variations on FIG. 7 exclude the creating step 312; even a single saved 332 description provides data useful for security analysis. Some variations on FIG. 7 include the detecting 702 and corresponding saving 332 steps but exclude the recognizing 706 and corresponding saving 332 steps; some include the recognizing 706 and corresponding saving 332 steps but exclude the detecting 702 and corresponding saving 332 steps. Additional variations include the ascertaining 804 step and a corresponding saving 332 step, in combinations with detecting 702 or recognizing 706 or both. These are merely examples of variations; as noted elsewhere, any operable combination of steps that are disclosed herein may be part of a given embodiment.

FIGS. 1 to 6 illustrate unpacking system 202 architectures with implicit or explicit actions, e.g., tracking intercepted auto-unpacker 208 actions to gather 818 telemetry 820 that characterizes 822 a given auto-unpacker, copying data to or from memory portions 214, installing hooks 306, displaying or transmitting a created 312 file, or otherwise processing data 118, in which the data 118 includes, e.g., hook routines 306 (a.k.a. hooks), memory portion 214 content, memory portion 214 descriptions 216, packed programs 402, and process identifiers 426, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types data in response to process 124 execution or kernel 120 execution. But no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 8. FIG. 8 is a supplement to the textual examples of embodiments provided herein and the textual descriptions of embodiments provided herein. In the event of any alleged inconsistency, lack of clarity, or excessive breadth due to an aspect or interpretation of FIG. 8, the text of this disclosure shall prevail over that aspect or interpretation of FIG. 8.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 800 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 8 to be non-operable, the sequence S is not within the scope of any claim. Any assertion otherwise is contrary to the present disclosure.

Some embodiments provide or utilize an unpacking method 800 performed by a computing system 202. In this discussion and generally elsewhere herein, "method" is used in the legal sense and "process" is used in the computer science sense. The method includes at least the following.

Prior to a target process receiving control, the method in this example includes executing 408 a process loader hook 326 on a process loader routine 324, the process loader routine configured to allocate 406 memory for a target process 210 prior to an execution period 410 of the target process. For example, some embodiments hook a finalize_exec process loader routine of a Linux® kernel, and some embodiments hook a NtCreateUserProcess process loader routine of a Windows® kernel (marks of Linus Torvalds, Microsoft Corporation, respectively). The process loader hook executing 408 includes saving 308 a map 310 of memory which is allocated to the target process.

The method in this example also includes, during the execution period of the target process, performing at least one of the following: detecting 702 an additional allocation attempt of a memory portion to the target process and saving a description of the memory portion, recognizing 706 a change attempt in an execution permission of a memory portion that is allocated to the target process and saving 332 a description 216 of the memory portion, or ascertaining 804 that the target process is attempting to overwrite a memory portion that was allocated to the target process before the execution period of the target process.

For example, the method in some cases detects 702 a new segment 214 via a page fault interrupt hook or a system call hook, and saves 332 at least a start address and a size of that particular memory segment as the description 216. As another example, the method in some cases recognizes 706 a segment 214 permission change via a page fault interrupt hook or a system call hook, and saves 332 at least a start address and given permissions of that particular memory segment as the description 216.

Some embodiments mitigate 826 a cybersecurity risk which is based at least in part on the target process. For example, in some scenarios an analysis of a memory portion that was written by the target process, or executed by the target process, or both, reveals that the target process includes malware. The risk of harm posed by that malware is then mitigated by removing the malware, quarantining the target process, or configuring a security control as a defense against the malware, for example. In some scenarios, analysis of code in memory written or executed by the target process reveals that no identified malware is present, and a failure to let the code execute would risk unnecessarily restricting functionality of the computing system. This risk is mitigated by marking or categorizing the analyzed code as benign and allowing it to execute.

In some embodiments, the unpacker 302 does not need to reside in user space or execute in user space 132 in order to perform its function of obtaining a non-encrypted non-compressed copy 212 of a packed payload 420. In some, the unpacking method is performed entirely in a kernel space 130 of the computing system.

Although a distinction is sometimes made in the industry between exceptions and interrupts, for convenience and clarity herein they are both included in the term "interrupt". Moreover, embodiments are not inherently limited to systems that use a particular division of responsibility between system calls and interrupts. The allocation tracking and permissions tracking of a given embodiment is done in response to system calls or done in response to interrupts, or both, depending on the embodiment.

In some embodiments, the unpacking method includes at least one of: installing 824 the process loader hook 326 on the process loader routine prior to an execution period of the target process; installing 824 an interrupt handler hook 318 on an interrupt handler, the interrupt handler hook configured to detect the additional allocation attempt of the memory portion to the target process and to save the description of the memory portion; installing 824 a system call hook 322 on a system call, the system call hook configured to detect the additional allocation attempt of the memory portion to the target process and to save the description of the memory portion; installing 824 an interrupt handler hook 318 on an interrupt handler, the interrupt handler hook configured to recognize the change attempt in the execution permission of the memory portion that is allocated to the target process and to save the description of the memory portion; or installing 824 a system call hook 322 on a system call, the system call hook configured to recognize the change attempt in the execution permission of the memory portion that is allocated to the target process and to save the description of the memory portion.

In some embodiments, the unpacking method 800 includes creating 312 a file containing content of multiple memory portions, the creating based at least in part on saved descriptions of the memory portions. In some cases, creating 312 the file includes at least one of: patching 810 a program header, or making 812 a section header.

In some embodiments, the unpacking method 800 avoids relying on write permission tracking; the unpacker 302 can unpack without tracking write permissions. In some embodiments, the unpacking method 800 produces 312 a persistent copy 422 of unpacked executable code of the target process. The persistent copy is persistent in the sense that it exists outside the memory allocated to the target process at a time after the execution period 410 of the target process is past and the memory is no longer allocated to the target process. The unpacking method in this example is free 814 of reliance on tracking 816 any target process memory portion write permission in order to produce the persistent copy. The unpacking method in this example is also free 814 of reliance on modifying 816 any target process memory portion write permission in order to produce the persistent copy.

Sometimes a process overwrites its own executable segment instead of allocating a new segment. In some embodiments, the method 800 includes ascertaining 804 that the target process is attempting to overwrite 806 a memory portion that was allocated to the target process before the execution period of the target process. Some embodiments can monitor any memory segment that is being overwritten within the process, because the unpacker 302 is called before the target process is executed.

Some unpacker embodiments don't monitor the write permissions per se. Instead, some monitor all the segments after they have been allocated in the first step of process loading, e.g., after the finalize_exec or NtCreateUserProcess hook. Each time the target process writes data into a segment, the unpacker embodiments saves a segment description 216 or makes a copy of the segment content. Ultimately only the segments or other portions 214 that have execute permission are relevant to the collection of unpacked content, so those portions are saved into a file 134. This is feasible because the unpacker 302 resides in kernel space and has access to all the logic that happens to the newly created process. Residence in kernel space allows the unpacker 302 to fully track a given image 210, even if the image is partially or fully loaded into the kernel space.

Some embodiments group 428 process IDs into families 428 based on spawning relationships or other characteristics. In some embodiments, process IDs 526 are grouped 428 because the malware is known to inject its logic into specific process(es). For example, some malware infects an antivirus process or root process, by injecting malware and thereby infecting the process. Sometimes these infected processes spawn new subprocesses. Some embodiments monitor a process previously known to be a malware infection candidate, and monitor any new process created within or by the candidate.

In some embodiments, the unpacking method 800 includes grouping 428 an identifier of the target process with an identifier of another process, the grouping based on at least a process spawning relationship 430, and associating 802 multiple process identifiers with a persistent copy of unpacked executable code of the target process based on at least the grouping.

In some embodiments, the unpacker changes an execution permission to executable. In some embodiments, the unpacking method 800 includes recognizing 706 a change attempt in an execution permission of a memory portion that is allocated to the target process, and the method 800 further includes changing 708 the execution permission to executable and then executing 408 content of the memory portion.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as interceptors 302 (a.k.a. unpackers 302), hook routines 306 (a.k.a. hooks 306), program headers 412, program section 414 headers 416, process identifier 426 groupings 428, process spawning relationships 430 as represented in computing system data 118, and operating system categories 504, in the form of data 118 and instructions 116, read from a removable storage medium 114 and/or another source such as a network connection, to form a configured storage medium. The configured storage medium 112 is capable of causing a computer system 202 to perform technical process steps for providing or utilizing auto-unpacker interception functionality 204 (which is a form of unpacker functionality), as disclosed herein. The Figures thus help illustrate configured storage media embodiments and process (a.k.a. method) embodiments, as well as system and process embodiments. In particular, any of the method steps illustrated in FIG. 7 or 8, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform an unpacking method 800. This method 800 includes: executing 408 a process loader hook on a process loader routine, the process loader routine configured to allocate memory for a target process 210 prior to an execution period of the target process, the process loader hook executing 408 including saving 308 a map of memory which is allocated to the target process; saving 332 a description of a memory portion in response to detecting 702 an additional allocation attempt of the memory portion or in response to recognizing 706 a change attempt in an execution permission of the memory portion or in response to ascertaining 804 that the target process is attempting to overwrite a memory portion that was allocated to the target process before the execution period of the target process; and creating 312 a file containing content of the memory portion based at least in part on the saved description of the memory portion.

In some embodiments, the target process 210 is a kernel space 130 process 124. In some, the target process 210 is a user space 132 process 124. In either case, interception 206 and other interceptor 302 actions proceed using hooks 306 as taught herein.

In some embodiments, the method 800 includes grouping 428 an identifier of the target process with an identifier of another process, and associating 802 multiple process identifiers with a persistent copy of unpacked executable code of the target process based on at least the grouping.

In some embodiments, the method 800 is performed entirely in a kernel space 130 of the computing system, and the method includes ascertaining 804 that the target process is attempting to overwrite 806 a memory portion that was allocated to the target process before the execution period of the target process.

In some embodiments, the file content 212 includes a malware 432.

Additional Observations

Additional support for the discussion of unpacking functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

Some unpackers are specific to a particular operating system, or correspond only to a known packer, or both. In contrast, some embodiments taught herein operate across multiple operating systems 502, include operating systems in different categories 504. Moreover, some embodiments taught herein provide unpacked content 212 from packed content 420 even when the particular algorithms used to pack the packed content 420 are unrecognized by the embodiment.

The broad applicability of the auto-unpacker interception unpacker 302 allows an automatic approach to malware detection and identification. Automation results in better malware recognition, better attack evasion, and better protection of assets, particularly in the IoT space which includes a large number of vulnerable devices 101. As another example, broad applicability facilitates use of the unpacker 302 in malware analysis pipelines.

Some embodiments include a broadly applicable Linux® unpacker 302 in the form of a Linux Kernel® module that is loaded to kernel space (mark of Linus Torvalds). By monitoring auto-unpacker 208 activity, hooking kernel mechanisms, and using low-level operating system kernel capabilities, the unpacker 302 is able to get the unpacked executable code or unpacked source code for a packed executable and save it for later analysis. Although many examples herein involve executable code, some target processes include packed source code.

Some embodiments intercept 206 certain systems calls and manipulate kernel execution logic via hooking routines. Some embodiments monitor certain interrupts, and are therefore able to spot unpacked segments while the target executable is running. Unpacked segments are saved then for further parsing. In some cases, the saved unpacked segments are corrected and reinserted into a target ELF or other executable, and as a result the embodiment provides a reconstructed executable.

Some embodiments include a hook on a kernel function 324 that is called after code for a new user process is loaded into memory and permissions for the new process are resolved, but before control is passed to the new user process. In some Linux® systems, this function 324 is finalize_exec, in some Windows® systems, this function 324 is NtCreateUserProcess. When the hook is activated, control passes to the interceptor 302, which makes a map of the memory that is allocated to the new user process, including which portions of memory belong to the new process and whether each portion is executable. After this hook is done running, control passes back to the process loader function 324 and then to the new user process.

In some embodiments, the interceptor 302 includes a dynamic kernel module. When it is loaded to kernel memory it places three kinds of hook.

One kind of hook is a hook placed on a process loader 324. When this hook is called the unpacker 302 will get a map of all the allocated segments for a specified process. If the process is a targeted process 210, the unpacker 302 will save those memory segment descriptions, so they can be used to identify new segments appended by the process after it started running. In some cases, after the process has been loaded to the memory and starts executing it will add new segments, or change older segments' permissions, which will allow the unpacker 302 to identify those segments. In some cases, the targeted process 210 is identified to the unpacker 302 based on the name of the ELF file or other executable file loaded for execution. ELF refers to Executable and Linkable Format, formerly named Extensible Linking Format.

A second kind of hook is a hook placed on a kernel interrupt handling code. When this hook is called the unpacker 302 will sort interrupts that relate to target process and interrupts that relate to memory issues, e.g., page fault interrupts. If the interrupt pertains to the target process 210 and is a page fault interrupt, and if it points to a targeted segment, then the unpacker 302 will save this whole segment block into a file. A targeted segment is a new segment that wasn't seen during the process loader hook, and has been given added execution permissions. Although segments are discussed here and in other examples, or memory portions 214 are utilized in some embodiments, e.g., sectors or pages. A whole segment block equals a segment where each segment consists of number of pages. After a full run of the target process 210, the unpacker has produced a file full of opened segments of memory; opened in this context means that those segments are of original executable code, that is, unpacked code. However, the unpacker 302 is still useful even when it only produces part of the original executable code for subsequent analysis.

A third kind of hook is a hook placed on kernel system call code. When this hook is called the unpacker 302 will sort the system calls that have been executed on memory of the targeted process. If the system call is a system call that alters memory permissions (e.g., mmap) for a segment that was allocated in the targeted process, the unpacker 302 will save this segment ELF and its current permissions for further unpacker 302 execution. As noted above, the unpacker 302 looks for a segment or other memory portion that hasn't been allocated in the first stage of the process creation, and a segment that has execution permission. Some embodiments monitor only for the presence of execution permissions, and some monitor only for attempts to add execution permission. Some embodiments also monitor write permission, e.g., to help detect malware that overwrites its own already executable memory.

In short, some embodiments place these three kinds of hooks, and then every time a hook is called the embodiments sort relevant calls and save relevant data from those hooks. In many cases, the interrupt handler hook 318 will be called numerous times, resulting in creation of a file that contains all of the opened memory segments data 212. In some embodiments, that data is a desired result which can be studied directly by a security analyst. In some, the data 212 is inserted into a packed elf binary.

Different hooks sometimes treat different data as relevant. For interrupt handling hooks in some embodiments, relevant data includes the data passed for each page fault, e.g., specific registers set and problematic address. For process loader hooks in some embodiments, relevant data includes the process name and its pre-execution allocated segments. For system call table hooks in some embodiments, relevant data includes the memory address and the requested permissions.

In some embodiments, after saving all the segments into a file a patcher logic 810 runs. Patching 810 gets the segments file, a.k.a. the dump, (the file that contains all the extracted segments) and the original elf or other executable of the target process 210. Then the patcher patches parts of the original ELF according to extracted segments. The program header 412 of the dump is patched to align it to virtual headers instead of physical ones, if the dump is not properly aligned or if the headers in the dump do not match the expected layout. After patching the program header, a section header 416 is created 812 based on values inferred from the program header and dynamic segment, if it exists. In some cases, this includes analyzing the contents of the dump and using this information to generate a new section header that accurately reflects the layout and structure of the original ELF file.

In some embodiments, the unpacker 302 includes hooks on kernel functions that allocate memory and hooks on kernel functions that change memory execution permission.

When a page is modified to receive execution permission, a hook saves a copy of the page. When a page is not in the map noted above, a hook saves a copy of the page. Some embodiments don't operate at a single page resolution, but operate instead with a whole executable block. Accordingly, the memory portions 214 in these embodiments are memory segments. Often a single memory segment represents the execution unit of code that is going to be executed.

In some embodiments, the only actual kernel method per se that is hooked is finalize_exec or the other process loader. In these embodiments, hooks on system calls that relate to memory allocation and permissions are not considered hooks on kernel methods per se.

Some embodiments do not save the whole page/memory segment that has received execution permission, to avoid making the unpacker 302 driver unacceptably slow. Instead, they save only the start address, size, and given permissions of that particular memory segment. In some embodiments, the relevant memory segment content is saved into the file each time the unpacker 302 handles a relevant interrupt, e.g., a relevant page fault. As a result, saving into the file happens when the targeted process tries to access the relevant page.

In some kernels, an exception mechanism implements interrupt handling, but in different architectures the interrupts are implemented over an exception mechanism. Some embodiments put a hook on the interrupt handle routines in order to be called when execution should have happened.

In some embodiments, each page or other memory portion saved by the embodiment is associated with the process identifier (e.g., pid) of the process that was operating on the page. In some embodiments, process identifiers are also grouped into families based on which process spawned which other process, so pages may be grouped into a family even if they are operated on by different processes, when the processes are in the same family as each other.

Some embodiments avoid false positives, in the sense of not saving copies of packed code or copies of code from a non-targeted process family, or both. Some embodiments save all the memory segments that haven't been created during the creation of the process. An embodiment sometimes saves a memory segment that has been created on behalf of the process in the first initial step of the process creation, when that segment received execution permission later and didn't have this permission when it was created.

Some embodiments save all the memory segments that have an added execution permission, when the process tries to execute them. After successfully saving this memory segment to file, an embodiment will change the permissions of the memory segment to executable and restore the normal flow of execution. For instance, after a page fault occurred and the memory segment is saved, some embodiments will add back execution permission and set its execution to occur next. So as long as a memory segment has been added after the target process started and its permission has been changed at interrupt handling during the execution, these embodiments will save it to the file. Some embodiments store only memory segments according to rules described herein, which results in saving only the segments that have been unpacked by the target process at runtime. Accordingly, false positives are avoided.

In some cases, a process overwrites its own executable segment instead of allocating a new segment. There will be no page fault or system call or other hooked item for the unpacker 302 to catch at the time of overwrite in embodiments that do not monitor write permission changes, because there will be no additional memory allocation and no change in execution permission. Accordingly, some embodiments monitor write permission changes for all the segments of the process. This allows the embodiments to spot an old (i.e., allocated pre-execution) memory segment that is being overwritten, thus again catching the execution with a page fault hook.

Some embodiments utilize or provide a cybersecurity method, including: loading an unpacker into a kernel space, the unpacker monitoring user space activity using a different kernel mechanism, the unpacker getting unpacked source code using a different low level OS kernel aspect, and submitting the unpacked source code to a security scanner.

In some embodiments, kernel mechanisms include executable loading logic, system call table logic, and interrupt or faults logic.

An example of executable loading logic is ELF loading logic, and more generally process loaders 324. Each ELF is a Linux® executable which at some point is going to be executed. The process of the execution of the ELF partly exists in the user mode 132 and partly in kernel space 130, but the part used in unpacker 302 is logic executed in the kernel space 130. In the kernel space at the appropriate stage each Elf's memory segments (.dynamic, .dynstr, .dynsym, .plt, .got, .hash, etc.) will be mapped and loaded into the memory, after which reallocations will be corrected and other relevant process loading logic will be executed. Some embodiments set a hook in a late part of that process loading, e.g., on a method named finalize_exec.

As to system call table logic, a system call table (e.g., syscalls) is a mechanism that allows execution of kernel logics via calls to the kernel from user mode. There are various system calls that manage or interface with much of the OS. In some embodiments, the unpacker 302 puts a hook on the system call table on system calls to monitor and find the auto-unpacking process, such as system calls that manage permissions on memory areas.

As to interrupts or faults logic, an Interrupt Descriptor Table and a Fault into Table are different mechanisms in different architectures of Linux®, but they share the purpose of enabling handling of interrupts or faults. This mechanism allows the processor to handle different interruptions (physical or programmable) and defines what code should be executing, at what stage, handling what interrupt. Although distinctions are sometimes made between interrupts and faults, faults are treated in some embodiments as a kind of interrupt.

In some embodiments, low level OS kernel aspects include architecture specific assembly programing, memory management, kernel running context, kernel hooks, and kernel specific registers and structs. As to architecture specific assembly programming, some embodiments include a Linux® kernel module that is implemented partially in assembly language. Intervention 206 in kernel logics also involves low level OS kernel aspects. Some embodiments utilize Linux® memory management (virtual) in different scenarios, e.g., memory system calls, page table entries, virtual memory allocation flow.

As to kernel running context, some embodiments operate in different running contexts, for instance running as an interrupt handling method which includes an assembly code trampoline that prepares registers and then jumps to the relevant interrupt handling method 318 whose behavior is discussed herein. Some embodiments use different types of hooks at runtime, depending on details that vary according to the kernel environment and runtime. Some embodiments are tailored to different architectures, e.g., by using different sets of registers and different structs in association with those registers, e.g., the pt_regs struct.

In some embodiments, the system 202 is an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as decompression, decryption, memory allocation, interrupt handling, making system calls, and process loading, which are each an activity deeply rooted in computing technology. Some of the technical mechanisms discussed include, e.g., hooks 306, interrupt handlers 316, system calls 320, process loaders 324, operating systems 502, auto-unpackers 208, and interceptor unpackers 302. Some of the technical effects discussed include, e.g., obtaining unpacked content 212 without necessarily recognizing the particular algorithms used to pack the content 420, recognition of related 430 processes 124, increased protection of an unpacker 302 by execution in kernel space 130, and gathered telemetry 820 which helps distinguish auto-unpackers 208 from one another. Thus, purely mental processes and activities limited to pen-and-paper are clearly excluded. Other advantages based on the technical characteristics of the teachings will also be apparent to one of skill from the description provided.

One of skill understands that unpacking packed content 420 is a technical activity which cannot be performed mentally, because it requires traversal of computing system memory 112. This includes, for example, decompression and decryption. As disclosed herein, unpacking also involves installing 824 hooks 306, which cannot be performed mentally or manually. Moreover, mental or pen-and-paper activity cannot configure a computing system to save 308 memory allocation maps 310 and to save 332 memory portion descriptions 216 as described herein during unpacking. One of skill also understands that attempting to perform interrupt handling even in part manually would create unacceptable delays in program execution, and would introduce a severe risk of human errors that can cause programs to crash. People manifestly lack the speed, accuracy, memory capacity, and specific processing capabilities required to perform auto-unpacker interception 206.

In particular, unpacking packed data 420 is a part of computing technology. Hence, the unpacking improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as an unpacker 302.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to obtain unpacked content 212 for security analysis when the packing algorithms are unknown, how to convert a file 134 of unpacked content 212 into an executable file 134 such as an ELF file, how to detect attempts by a malware to avoid detection by overwriting only itself, and how to gather unpacked content for multiple cooperating processes 124. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present subject matter, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" 124 is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Unpacking operations such as hooking 306, saving 308 memory maps, saving 216 memory portion descriptions, and many other operations discussed herein (whether recited in the Figures or not), are understood to be inherently digital. A human mind cannot interface directly with a CPU or other processor, or with RAM or other digital storage, to read and write the necessary data to perform the auto-unpacker interception-based unpacking steps 800 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as allocating, ascertaining, associating, calling, changing, creating, detecting, distinguishing, executing, gathering, hooking, installing, intercepting, interrupting, loading, making, packing, patching, performing, recognizing, relating, saving, unpacking (and allocates, allocated, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor or set of processors; includes hardware
- 112 computer-readable storage medium, e.g., RAM, hard disks
- 114 removable configured computer-readable storage medium
- 116 instructions executable with processor; may be on removable storage media or in other memory (volatile or nonvolatile or both)
- 118 digital data in a system 102; data structures, values, source code, and other examples are discussed herein
- 120 kernel(s), e.g., operating system(s), BIOS, UEFI, device drivers; also refers to an execution engine such as a language runtime
- 122 software tools, software applications, security controls; computational
- 124 process, in the computing science sense
- 126 display screens, also referred to as "displays"
- 128 computing hardware not otherwise associated with a reference number 106, 108, 110, 112, 114
- 130 kernel space, a.k.a. kernel mode, as represented in a computing system
- 132 user space, a.k.a. user mode, as represented in a computing system
- 134 file or other data storage container in a computing system
- 136 cloud, also referred to as cloud environment or cloud computing environment
- 202 enhanced computing system, i.e., system 102 enhanced with functionality 204 as taught herein
- 204 auto-unpacker interception-based functionality (also referred to as "auto-unpacker interception functionality", "unpacking functionality 204"), e.g., software or specialized hardware which performs or is configured to perform steps 308 and 702, or steps 308 and 706, or steps 308 and 804, or steps 818 and 822, or steps 824 and 306 for one or more of the hooks 318, 322, and 326, or any software or hardware which performs or is configured to perform a novel method 800 or a computational auto-unpacker action interception 206 activity first disclosed herein, or a computational unpacking activity first disclosed herein
- 206 computationally intercept an action in a computing system, e.g., using a hook 306, thereby supplementing, modifying, or replacing the action
- 208 auto-unpacker in a packed process or a packed file; digital, computational
- 210 packed target process or packed executable file corresponding to a target process, as represented in a computing system
- 212 unpacked content, including data which is at least not compressed and not encrypted; digital
- 214 memory portion in a computing system, part of memory 112, e.g., a page, segment, block, etc.
- 216 description of a memory portion 214, e.g., start and end addresses or start address and size, or index in a list of memory portions; digital
- 302 interceptor, also referred to as unpacker 302, auto-unpacker interceptor 302; software which embodies a functionality 204
- 304 computationally execute a hook 306
- 306 hook in a computing system, presumed to be one of the three kinds 318, 322, 326 of hooks; also refers to the hook routine which is configured to receive execution control via the hook mechanism; hook is also used as a verb to mean installing a hook or executing a hook, depending on context
- 308 computationally save a map 310, e.g., by writing a copy to storage allocated by or for the interceptor 302
- 310 map of memory portions allocated to a given process prior to execution of the process, e.g., portions allocated by a process loader 324; e.g., a list of descriptions 216; digital
- 312 computationally create a file which contains unpacked content 212; executable files containing unpacked code 212 are an example, but a file of unpacked content 212 is not necessarily also an executable file
- 314 interrupt or fault or exception in a computing system, referred to collectively herein as interrupts
- 316 interrupt handler or fault handler or exception handler in a computing system, referred to collectively herein as interrupt handlers
- 318 hook 306 on an interrupt handler
- 320 system call in a computing system
- 322 hook 306 on a system call
- 324 process loader in a computing system, which allocates memory for a process before the process initially receives execution control
- 326 hook 306 on a process loader
- 328 execute permission, or write permission, or both, on a memory portion, as represented in a computing system
- 330 interface generally in a computing system; computational, digital
- 332 computationally save a memory portion description 216, e.g., by writing a copy to storage allocated by or for the interceptor 302
- 402 program in a computing system 404 execution control in a computing system
406 memory allocation; refers to the computational activity of allocating memory (by code requesting memory or by code responding to the request); also refers to a result of such computational activity
408 execution of code, also referred to as running code
410 execution period, begins when process execution begins, ends when process terminates; may include periods in which process execution is suspended
412 program header; digital
414 section in a program, e.g., code section, data section
416 section 414 in a computing system
420 packed code or other packed content; digital; 420 also refers to the computational activity of packing, e.g., encrypting and compressing, or encrypting
422 persistent copy of data, relative to the execution period of a process; may be in volatile or nonvolatile memory
424 copy of data, not necessarily persistent
426 process identifier; digital
428 group of process identifiers or group of processes, as represented in a computing system; also referred to as a family; also refers to computational activity of creating or modifying such a group
430 relationship between processes or process identifiers, as represented in a computing system
432 malware, e.g., virus, worm, adware, ransomware, key logger, etc.
434 compression; computational activity or result thereof
436 compression status of data, as represented in a computing system, e.g., compressed or not compressed
438 medical software, e.g., software designed specifically for medical use or use by medical professionals
440 encryption; computational activity or result thereof
442 encryption status of data, as represented in a computing system, e.g., encrypted or not encrypted
444 game software, e.g., video game software, board game software, puzzle software
446 security, e.g., cybersecurity or privacy, as represented in a computing system
448 security software, e.g., forensics tools, antivirus tools, security controls
502 operating system in a computing system
504 operating system category; digital
506 characteristic of software being at least partially open source
508 open source kernel
510 characteristic of software being primarily or entirely closed source, as measured, e.g., by portion of executable code or portion of source code or both
512 closed source kernel
600 data flow diagram; system architecture consistent with FIG. 6 data flow diagram
700 flowchart; 700 also refers to unpacking methods that are illustrated by or consistent with the FIG. 7 flowchart or any variation of the FIG. 7 flowchart described herein
702 computationally detect an allocation event, e.g., via a hook on a system call that performs allocation 406
706 computationally recognize a permission change event, e.g., via a hook on an interrupt that fires when an attempt is made to write memory that lacks write permission or when an attempt is made to execute memory (that is, execute content of memory) that lacks execute permission
708 change in a permission 328, as represented in a computing system
800 flowchart; 800 also refers to unpacking methods that are illustrated by or consistent with the FIG. 8 flowchart, which incorporates the FIG. 7 flowchart and other steps taught herein, or methods that are illustrated by or consistent with any variation of the FIG. 8 flowchart described herein
802 computationally associate process identifier(s) with a copy of unpacked content, e.g., implicitly by limiting the copy based on the process identifier(s), or explicitly by listing the process identifiers in a database that includes or identifies the copy
804 computationally ascertain an attempt by a process to overwrite itself, e.g., based on a map 310 and write permission faults
806 computationally overwrite self, as when a process overwrites a portion of its own executable memory
808 computationally perform entirely in kernel space, as opposed to performing at least partially in user space
810 computationally patch a program header, e.g., create or modify data to provide a program header consistent with an executable file format such as ELF format; 810 also refers to software which upon execution performs patching
812 computationally make a program section header, e.g., create or modify data to provide a section header consistent with an executable file format such as ELF format
814 computationally avoid reliance on a specified action 816 to accomplish a desired outcome, e.g., either accomplish the outcome without performing the action or be capable of accomplish the outcome even if the action is nullified or omitted
816 specified computational action
818 computationally gather telemetry, e.g., by logging hook calls
820 telemetry data
822 computationally distinguish between auto-unpackers based at least partially on telemetry corresponding to hook calls
824 computationally install a hook 306
826 computationally mitigate a cybersecurity risk, e.g., remove malware, quarantine malware or suspect code, modify code to remove a malware threat, distinguish malware from non-malware, scan or analyze code and determine it does not contain any detected malware, install or reconfigure a security control as a defense against malware, or remediate damage done by malware, or a combination thereof
828 any step or item discussed in the present disclosure that has not been assigned some other reference numeral; 828 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments of an interception-based unpacker 302 leverage an auto-unpacker 208 of a packed 420 file 134, using certain hooks 306, to obtain unpacked content 212 even when the specific compression and encryption algorithms that were used to pack the packed file are unknown. The unpacked content is studied directly, or injected into a copy of the packed file to create 312 an unpacked executable version of the packed file. A hook 326, 306 on a process loader 324 is utilized to obtain a pre-execution map 310 of memory allocated to a target packed process 210. One or more interrupt hooks 318, 306 or system call hooks 322, 306, which are triggered by permission 328 changes or by write permission or execution permission exceptions, are utilized to obtain copies of unpacked content. In some embodiments, the interception-based unpacker 302 executes primarily or entirely in kernel space 130. Some embodiments of the interception-based unpacker are operable in open source kernel 508 or closed source kernel 512 operating systems 502.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An unpacking method performed by a computing system, the unpacking method comprising:
   prior to a target process receiving control, executing a process loader hook on a process loader routine, the process loader routine configured to allocate memory for the target process prior to an execution period of the target process, the process loader hook executing comprising saving a map of memory which is allocated to the target process; and
   during the execution period of the target process, performing at least one of the following:
      detecting an additional allocation attempt of a memory portion to the target process and saving a description of the memory portion,
      recognizing a change attempt in an execution permission of a memory portion that is allocated to the target process and saving a description of the memory portion, or
      ascertaining that the target process is attempting to overwrite a memory portion that was allocated to the target process before the execution period of the target process and saving a description of the memory portion.

2. The method of claim 1, further comprising mitigating a cybersecurity risk which is based at least in part on the target process.

3. The method of claim 1, wherein the unpacking method is performed entirely in a kernel space of the computing system.

4. The method of claim 1, further comprising at least one of:
   installing the process loader hook on the process loader routine prior to an execution period of the target process;
   installing an interrupt handler hook on an interrupt handler, the interrupt handler hook configured to detect the additional allocation attempt of the memory portion to the target process and to save the description of the memory portion;
   installing a system call hook on a system call, the system call hook configured to detect the additional allocation attempt of the memory portion to the target process and to save the description of the memory portion;
   installing an interrupt handler hook on an interrupt handler, the interrupt handler hook configured to recognize the change attempt in the execution permission of the memory portion that is allocated to the target process and to save the description of the memory portion; or
   installing a system call hook on a system call, the system call hook configured to recognize the change attempt in the execution permission of the memory portion that is allocated to the target process and to save the description of the memory portion.

5. The method of claim 1, wherein the unpacking method further comprises creating a file containing content of multiple memory portions, the creating based at least in part on saved descriptions of the memory portions.

6. The method of claim 5, wherein creating the file comprises at least one of: patching a program header, or making a section header.

7. The method of claim 1, wherein the method produces a persistent copy of unpacked executable code of the target process, the persistent copy exists outside the memory allocated to the target process at a time after the execution period of the target process is past and the memory is no longer allocated to the target process, the unpacking method is free of reliance on tracking any target process memory portion write permission in order to produce the persistent copy, and the unpacking method is also free of reliance on modifying any target process memory portion write permission in order to produce the persistent copy.

8. The method of claim 1, comprising at least one of:
   ascertaining that the target process is attempting to overwrite a memory portion that was allocated to the target process before the execution period of the target process; or
   recognizing a change attempt in an execution permission of a memory portion that is allocated to the target process, changing the execution permission to executable, and then executing content of the memory portion.

9. The method of claim 1, further comprising grouping an identifier of the target process with an identifier of another process, the grouping based on at least a process spawning relationship, and associating multiple process identifiers with a persistent copy of unpacked executable code of the target process based on at least the grouping.

10. A computing system which is configured to obtain unpacked file content from packed file content, the computing system comprising:
- a digital memory;
- a processor set comprising at least one processor, the processor set in operable communication with the digital memory;
- an auto-unpacker interceptor;
- wherein the auto-unpacker interceptor is configured to, upon execution by the processor set, execute a process loader hook on a process loader routine, the process loader routine configured to allocate memory for a target process prior to an execution period of the target process, the process loader hook executing comprising saving a map of memory which is allocated to the target process, the auto-unpacker interceptor is also configured to upon execution save a description of a memory portion in response to detecting an additional allocation attempt of the memory portion or in response to recognizing a change attempt in an execution permission of the memory portion or in response to ascertaining that the target process is attempting to overwrite a memory portion that was allocated to the target process before the execution period of the target process, and the auto-unpacker interceptor is also configured to upon execution create a file containing content of the memory portion based at least in part on the saved description of the memory portion.

11. The computing system of claim 10, wherein the file content is not compressed and the file content is not encrypted.

12. The computing system of claim 10, wherein the file content comprises at least one of: a malware, a security software, a game software, or a medical software.

13. The computing system of claim 10, comprising at least one of:
- an interrupt handler hook on an interrupt handler, the interrupt handler hook configured to detect the additional allocation attempt of the memory portion to the target process and to save the description of the memory portion; or
- an interrupt handler hook on an interrupt handler, the interrupt handler hook configured to recognize the change attempt in the execution permission of the memory portion that is allocated to the target process and to save the description of the memory portion.

14. The computing system of claim 10, comprising at least one of:
- a system call hook on a system call, the system call hook configured to detect the additional allocation attempt of the memory portion to the target process and to save the description of the memory portion; or
- a system call hook on a system call, the system call hook configured to recognize the change attempt in the execution permission of the memory portion that is allocated to the target process and to save the description of the memory portion.

15. The computing system of claim 10, wherein the target process comprises a system call to an operating system which belongs to at least one of the following operating system categories:
- open source kernel operating systems; or
- closed source kernel operating systems.

16. A computer-readable storage device configured with data and instructions which upon execution by a processor cause a computing system to perform an unpacking method, the unpacking method comprising:
- executing a process loader hook on a process loader routine, the process loader routine configured to allocate memory for a target process prior to an execution period of the target process, the process loader hook executing comprising saving a map of memory which is allocated to the target process;
- saving a description of a memory portion in response to detecting an additional allocation attempt of the memory portion or in response to recognizing a change attempt in an execution permission of the memory portion or in response to ascertaining that the target process is attempting to overwrite a memory portion that was allocated to the target process before the execution period of the target process; and
- creating a file containing content of the memory portion based at least in part on the saved description of the memory portion.

17. The computer-readable storage device of claim 16, wherein the target process is a kernel space process.

18. The computer-readable storage device of claim 16, wherein the method further comprises grouping an identifier of the target process with an identifier of another process, and associating multiple process identifiers with a persistent copy of unpacked executable code of the target process based on at least the grouping.

19. The computer-readable storage device of claim 16, wherein the method is performed entirely in a kernel space of the computing system, and the method comprises ascertaining that the target process is attempting to overwrite a memory portion that was allocated to the target process before the execution period of the target process.

20. The computer-readable storage device of claim 16, wherein the file content comprises a malware.

* * * * *